United States Patent
Chaudhri et al.

(10) Patent No.: US 11,816,269 B1
(45) Date of Patent: Nov. 14, 2023

(54) GESTURE RECOGNITION FOR WEARABLE MULTIMEDIA DEVICE USING REAL-TIME DATA STREAMS

(71) Applicant: Humane, Inc., San Francisco, CA (US)

(72) Inventors: Imran A. Chaudhri, San Francisco, CA (US); Bethany Bongiorno, San Francisco, CA (US); Patrick Gates, San Francisco, CA (US); Wangju Tsai, Pleasanton, CA (US); Monique Relova, South San Francisco, CA (US); Nathan Lord, San Jose, CA (US); Yanir Nulman, San Francisco, CA (US); Ralph Brunner, Los Gatos, CA (US); Lilynaz Hashemi, San Francisco, CA (US); Britt Nelson, Sausalito, CA (US)

(73) Assignee: Humane, Inc., San Francisco, CA (US)

( * ) Notice: Subject to any disclaimer, the term of this patent is extended or adjusted under 35 U.S.C. 154(b) by 24 days.

(21) Appl. No.: 17/334,619

(22) Filed: May 28, 2021

Related U.S. Application Data

(60) Provisional application No. 63/032,499, filed on May 29, 2020.

(51) Int. Cl.
*G06F 3/01* (2006.01)
*G06V 40/20* (2022.01)
(Continued)

(52) U.S. Cl.
CPC .............. *G06F 3/017* (2013.01); *G06F 1/163* (2013.01); *G06F 17/17* (2013.01); *G06N 5/04* (2013.01); *G06T 7/50* (2017.01); *G06T 7/70* (2017.01); *G06V 10/762* (2022.01); *G06V 40/10* (2022.01); *G06V 40/28* (2022.01); *G06T 2207/10028* (2013.01); *G06T 2210/12* (2013.01)

(58) Field of Classification Search
CPC .......... G06F 3/017; G06F 1/163; G06F 17/17; G06N 5/04; G06T 7/50; G06T 7/70; G06T 2207/10028; G06T 2210/12; G06V 10/762; G06V 40/10; G06V 40/28
See application file for complete search history.

(56) References Cited

U.S. PATENT DOCUMENTS

| 11,402,909 | B2 * | 8/2022 | Forsland | ................. G06F 3/012 |
| 2011/0098056 | A1 * | 4/2011 | Rhoads | ................... G06F 3/023 |
| | | | | 345/173 |

(Continued)

*Primary Examiner* — Md K Talukder
(74) *Attorney, Agent, or Firm* — Fish & Richardson P.C.

(57) ABSTRACT

Systems, methods, devices and non-transitory, computer-readable storage mediums are disclosed for gesture recognition for a wearable multimedia device using real-time data streams. In an embodiment, a method comprises: detecting a trigger event from one or more real-time data streams running on a wearable multimedia device; taking one or more data snapshots of the one or more real-time data streams; inferring user intent from the one or more data snapshots; and selecting a service or preparing content for the user based on the inferred user intent. In an embodiment, a hand and finger pointing direction is determined from a depth image, a 2D bounding box for the hand/finger is projected into a 2D image space and compared to bounding boxes for identified/labeled objects in the 2D image space to identify an object that the hand is holding or the finger is pointing toward.

18 Claims, 7 Drawing Sheets

(51) Int. Cl.
  *G06V 40/10*   (2022.01)
  *G06V 10/762*  (2022.01)
  *G06T 7/50*    (2017.01)
  *G06F 17/17*   (2006.01)
  *G06F 1/16*    (2006.01)
  *G06N 5/04*    (2023.01)
  *G06T 7/70*    (2017.01)

(56) References Cited

U.S. PATENT DOCUMENTS

| | | | |
|---|---|---|---|
| 2014/0080428 A1* | 3/2014  | Rhoads  | G06V 20/10 |
| | | | 455/88 |
| 2015/0366518 A1* | 12/2015 | Sampson | A61B 5/7275 |
| | | | 600/509 |
| 2015/0370858 A1* | 12/2015 | Lafuente Alvarez | |
| | | | G06F 16/2423 |
| | | | 707/770 |
| 2020/0348662 A1* | 11/2020 | Cella | G05B 23/0286 |
| 2021/0004405 A1* | 1/2021  | Solomon | G06F 1/1626 |
| 2021/0201510 A1* | 7/2021  | Crain | G06Q 30/0201 |
| 2022/0100453 A1* | 3/2022  | Miraj | G06F 1/1677 |
| 2022/0414403 A1* | 12/2022 | Hlavac | G06F 18/22 |

* cited by examiner

GESTURE RECOGNITION FOR WEARABLE MULTIMEDIA DEVICE USING REAL-TIME DATA STREAMS

CROSS-REFERENCE TO RELATED APPLICATION

This application claims priority to U.S. Provisional Patent Application No. 63/032,499, filed May 29, 2020, the entire contents of which are incorporated herein by reference.

TECHNICAL FIELD

This disclosure relates generally to touchless gesture recognition.

BACKGROUND

Modern mobile devices (e.g., smart phones, tablet computers, wearable computers) include an embedded camera and depth sensor that allows a user to capture digital images and engage in augmented reality and other applications that utilize camera images and depth data. These applications require manual user input through a mechanical keyboard/buttons, or through a touch screen graphical user interface, to invoke and interact with the application.

SUMMARY

Systems, methods, devices and non-transitory, computer-readable storage mediums are disclosed for gesture recognition for a wearable multimedia device using real-time data streams.

In an embodiment, a method comprises: detecting a trigger event from two or more real-time data streams running on a wearable multimedia device, each of the two or more real-time data streams carrying sensor data from a sensor of the wearable multimedia device; taking one or more data snapshots of the two or more real-time data streams; inferring user intent from the one or more data snapshots; and selecting a service or preparing content for the user based on the inferred user intent.

In an embodiment, upon detection of the trigger event, current data frames in the real-time data streams and past data frames stored on the wearable multimedia device are collected from data stream buffers.

In an embodiment, the past data frames each have a timestamp within a threshold time distance of the trigger event.

In an embodiment, the two or more data streams include a first data stream carrying a depth image frame from a depth sensor and a second data stream carrying a two-dimensional (2D) image frame from camera, and inferring user intent from the one or more data snapshots comprises inferring that a user wearing or holding the wearable multimedia device is pointing to or holding an object, the inferring comprising: projecting each pixel in the depth image frame into three-dimensional (3D) space using camera intrinsic parameters; generating a point cloud of 3D data points from the projected pixels; reducing a number of 3D data points in the point cloud to make the 3D data points more spatially uniform; dividing the reduced number of 3D points into potential hand clusters; deleting clusters with too few points; identifying for each potential hand cluster if it is a left or right hand by checking from which side arm points enter the depth image frame; removing the arm points from the identified hand cluster; determining a dominant axis of the hand cluster that represents the hand direction; isolating a finger cluster from the hand cluster; determining a dominant axis of the finger cluster to determine a finger pointing direction; projecting the bounding box for the hand into 2D camera image frame using the camera intrinsic parameters; generating a list of candidate held objects by intersecting the resulting 2D bounding box for the hand with one or more labeled 2D bounding boxes containing one or more recognized objects; for each candidate held object, determining a center point of the 2D bounding box containing the object and a distance from the center point to the hand cluster is determined; and selecting the closest candidate held object as the held object based on the distances.

In an embodiment, reducing the point cloud to make the 3D data points more spatially uniform, comprises: computing, using a voxel grid filter, a spatial average of the 3D data points confined by each voxel; determining a set of 3D data points which lie within the bounds of a voxel; and assigning the set of 3D data points to that voxel so as to statistically combine the set of 3D data points into one output 3D data point.

In an embodiment, identifying for each potential hand cluster if the hand cluster is a left or right hand comprises counting a number of the 3D data points in a left and a right third of the depth image frame, and whichever of the left or right-third has more points identifies the hand cluster as the user's left or right hand, respectively.

In an embodiment, the dominant axis of the hand cluster is determined by computing a least squares fit of a line to the 3D data points in the hand cluster.

In an embodiment, isolating a finger cluster from the hand cluster comprises: determining a 3D data point that is furthest away from the 3D depth sensor; and determining all the 3D data points that are within a specified distance of the furthest point to be the finger cluster.

In an embodiment, the dominant axis of the finger cluster is determined by computing a least squares fit of a line to the 3D data points in the finger cluster.

In an embodiment, deleting clusters with too few points comprises deleting clusters with less than a threshold number of points, determining if there are no clusters remaining, if there is one cluster remaining or if there are two clusters remaining; in accordance with determining that there are no clusters remaining, determining that there is no hand present in the depth image frame; in accordance with determining that there is one cluster remaining, determining that there is one hand present in the depth image frame; and in accordance with determining that there is two clusters remaining, determining that there is two hands present in the depth image frame.

Particular embodiments disclosed herein provide one or more of the following advantages. A streaming architecture on a small form factor, wearable multimedia device with multiple sensors (e.g., a camera, depth sensor, input audio device) and no built-in display, allows the capture of "snapshot" data from real-time data streams generated by the multiple sensors. Current and past snapshot data is used to infer the intent of a user of the wearable multimedia device. The snapshot data can be fused as needed to provide content or services to the user in accordance with the user's intent. Because the wearable multimedia device does not have a built-in hardware display for displaying content or user interaction, the architecture allows the user to express their intent for a service or content without commanding their full attention or interrupting a social interaction.

The details of the disclosed embodiments are set forth in the accompanying drawings and the description below.

Other features, objects and advantages are apparent from the description, drawings and claims.

DESCRIPTION OF DRAWINGS

The same reference symbol used in various drawings indicates like elements.

DETAILED DESCRIPTION

Example Wearable Multimedia Device

Figure 1:
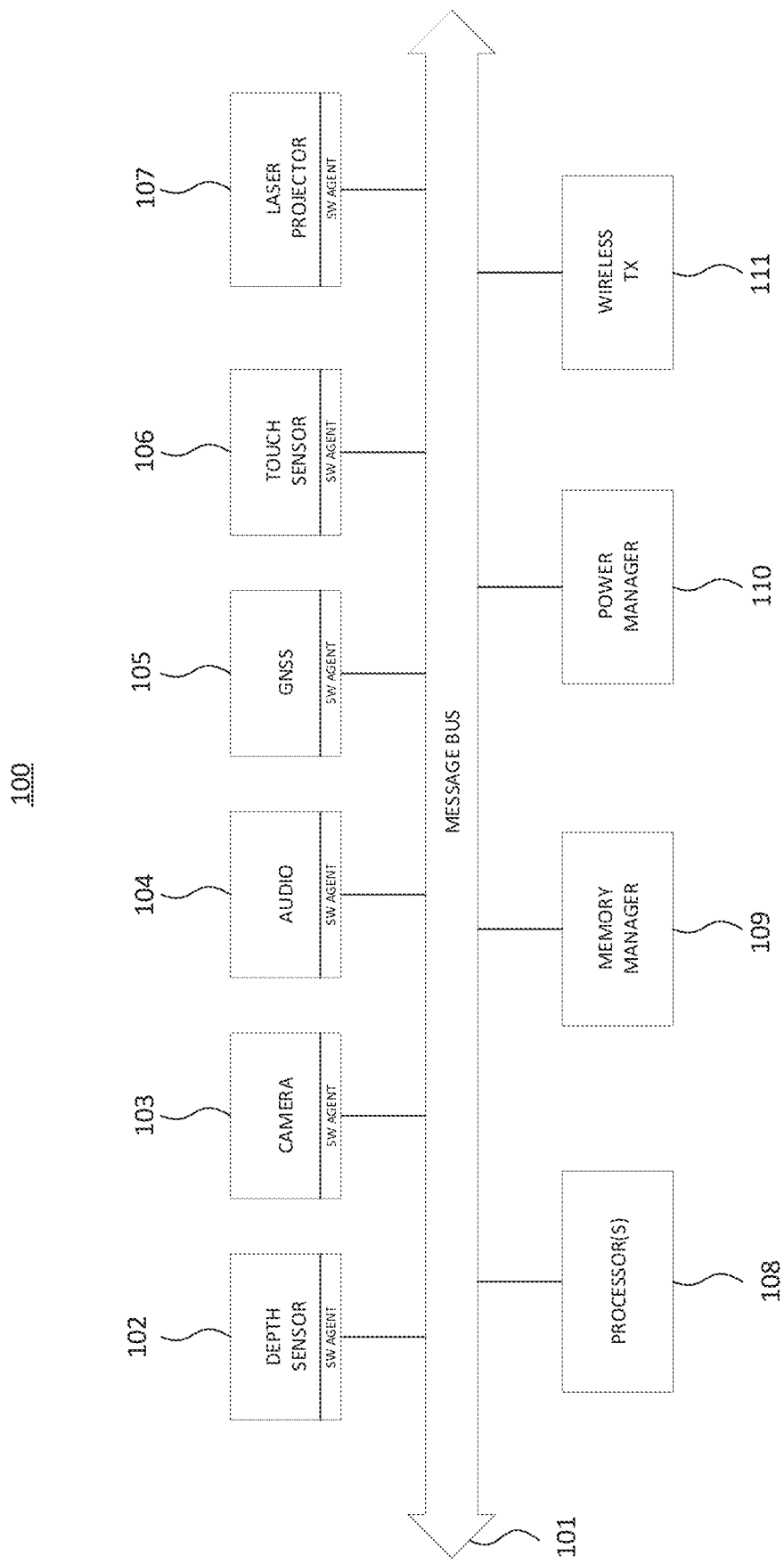
FIG. 1 illustrates a messaging system for a small form factor, wearable multimedia device, according to an embodiment.

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet or any other attachment mechanism. The wearable multimedia device includes a digital image capture device (e.g., 180° FOV with optical image stabilizer (OIS)) that allows a user to spontaneously capture multimedia data (e.g., video, audio, depth data) of life events and document transactions with minimal user interaction or device set-up. The multimedia data ("context data") captured by the wireless multimedia device is processed locally or uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes). In an embodiment, the device can include photovoltaic surface technology to sustain battery life and inductive charging circuitry (e.g., Qi) to allow for inductive charging on charge mats and wireless over-the-air (OTA) charging.

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector, LCoS, DLP, LCD), or can be wired or wirelessly coupled to an external projector, that allows the user to replay a moment on a surface such as a wall or table top. In another embodiment, the wearable multimedia device includes an output port that can connect to a projector or other output device.

In an embodiment, the wearable multimedia device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the wearable multimedia device does not include a hardware display and utilizes the camera and a depth sensor for gesture recognition and control, where the camera can detect and recognize hand and finger poses (e.g., finger pointing direction in 3D space). The camera image is processed using computer vision and/or machine learning models to estimate or predict/classify/annotate 2D or 3D bounding boxes of detected objects in the image, as described in further detail below.

System Overview

FIG. 1 illustrates a messaging system 100 for a small form factor, wearable multimedia device, according to an embodiment. System 100 includes multiple independent components/blocks/peripherals, including depth sensor 102, camera 103 (e.g., a wide FOV camera), audio subsystem 104 (e.g., including microphone(s), audio amplifier, loudspeaker, codec, etc.), global navigation satellite system (GNSS) receiver 105 (e.g., a GPS receiver chip), touch sensor 106 (e.g., a capacitive touch surface), laser projector 107, processors 108, memory manager 109, power manager 110 and wireless transceiver (TX) 111 (e.g., WiFi, Bluetooth, Near Field (NF) hardware and software stacks). Each hardware component 102-111 communicates with other hardware components 102-111 over message bus 102 through its own dedicated software agent or driver. In an embodiment, each component operates independent of other components and can generate data at different rates. Each component 102-107 is a subscriber (data consumer), data source or both subscriber and data source on bus 101.

For example, depth sensor 102 generates a stream of raw point cloud data and uses its software agent/driver to place the data stream on message bus 101 for subscribing components to retrieve and use. Camera 103 generates a data stream of image data (e.g., Red, Green Blue (RGB) frames) and uses its software agent/driver to place the raw image data stream on message bus 101. Audio subsystem 104 generates a stream of audio data, such as user speech input from a microphone, and uses its software agent/driver to place the audio data stream on message bus 101. GNSS 105 generates a stream of location data for the device (e.g., latitude, longitude, altitude) and uses its software agent/driver to place the location data stream on message bus 101. Touch sensor 106 generates a stream of touch data (e.g., taps, gestures), and uses its software agent/driver to place the touch data stream on message bus 101.

Laser projector 107, processors 108, memory manager 109, power manager 110 and wireless TX 111 are core system resources of the device and are coupled together through one or more buses not shown (e.g., system bus, power bus). In an embodiment, the core system resources also have dedicated software agents or drivers to provide system information to the other components, such as battery state of charge (SOC), memory available, processor bandwidth, data buffering for remote sources (e.g., WiFi, Bluetooth data), etc. Each of the components can use the system information to, for example, adjust to changes in the core system resources (e.g., adjust data capture rate, duty cycle).

As defined herein, a "software agent" is code that operates autonomously to source and/or acquire data from a message bus or other data pipeline on behalf of a hardware component or software application. In an embodiment, software agents run on the operating system of the device and use Application Programming Interface (API) calls for low-level memory access through memory manager 109. In an embodiment, a software agent can acquire data from a shared system memory location and/or secured memory location (e.g., to acquire encryption keys or other secret data). In an embodiment, a software agent is daemon process that runs in the background.

Figure 2:
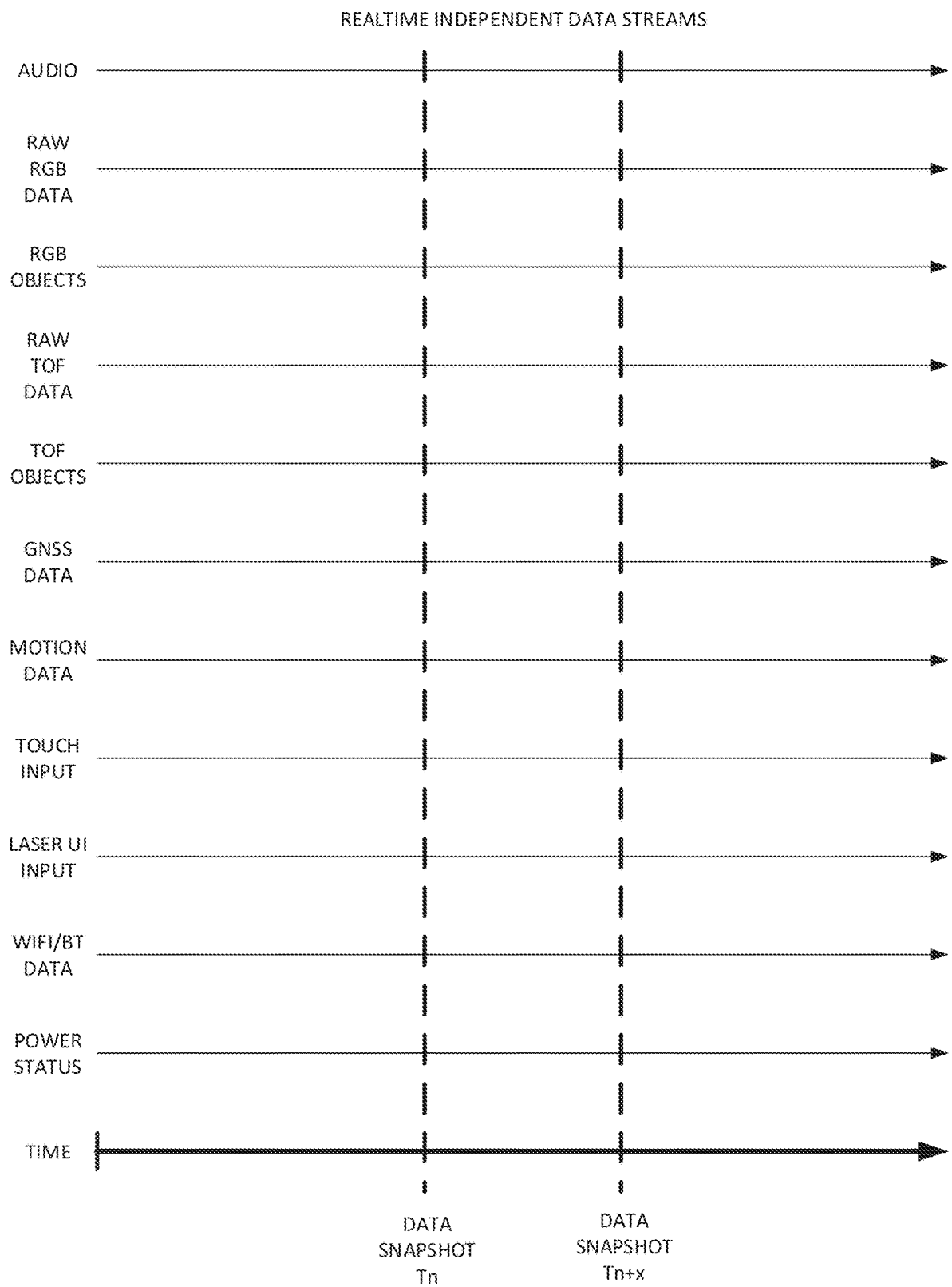
FIG. 2 illustrates the capture of a snapshot of multiple, independent real-time data streams in response to a trigger event, according to an embodiment.

FIG. 2 illustrates the capture of a snapshot of multiple, independent real-time data streams in response to trigger event, according to an embodiment. The data streams generated by the components of system 100 are illustrated. As can be observed, multiple timestamped data streams are concurrently generated and placed on message bus 101. Note that time increases from left to right in FIG. 2.

At any given time any of the software agents can detect a trigger event. Upon detection of a trigger event, the current data frames in the data streams and past data frames that have a timestamp within a threshold time distance of the event timestamp are collected from data stream buffers and stored in system or secure memory. Each data stream has a buffer (dedicated or shared) that is capable of storing N frames of past snapshot data, also referred to herein as "history data." The current snapshot data and past snapshot data, i.e., history data, is made available in memory to be used for various content and service related tasks, as described in further detail below.

For example, assume a user has wearable multimedia device attached to her clothes. The device includes one or more microphones that are configured to monitor for speech input in the form of, for example, speech commands or queries. The device also includes a wide FOV camera (e.g., 120 degree FOV) that is configured to capture images of the scene that the user is viewing and a depth sensor, such as time of flight (TOF) sensor that captures 3D data (a point cloud) of the scene. The user picks up an object in her hand and says, "do I have a winning number?" Her speech is converted to text which is parsed and analyzed by an inference engine that infers the users intent, which in this case is a question regarding an object presumably in the FOV of the camera. The inference engine triggers an event on the device and a current data snapshot is captured and stored in system memory of the device along with N past data snapshots for each data source. In this example, the speech text and the current and past frames of image and point cloud data are stored in system memory for further processing.

In an embodiment, the image frame is input into an instance image segmentation process on the device which is configured to label/annotate/classify (herein after collectively referred to as "label") the objects in the scene captured in the image. In an embodiment, the image is sent to a network-based server computer that has a machine learning model trained to predict the labels and generate bounding boxes for the objects. An example of a machine learning model that performs instance segmentation is the Mask Regional Convolutional Neural Network (R-CNN). The framework of the Mask R-CNN is based on two stages: first, it scans the image to generate proposals; which are areas with a high likelihood to contain an object. Second, it classifies these proposals and creates bounding boxes and masks. Other instance image segmentation algorithms can also be used.

To protect user and third party privacy, in an embodiment semantic segmentation is first performed on the device to predict object masks but not label the objects. Then only the object data (pixel data within the mask) is sent to the server for instance segmentation rather than the entire image frame. In an embodiment, the outbound unlabeled objects and the inbound labeled objects are encrypted before leaving the device or server.

Concurrently or serially with the image processing, the depth data in the data snapshot is processed to detect 3D objects using computer vision algorithms, as described in more detail in reference to FIGS. 2-5. In an embodiment, known 3D object detection deep learning networks, such as PointRNN or VoxelNet can be used to detect and label 3D objects in a point cloud either on the device or on a network-based server computer. In this particular example, the depth data processing is for predicting or estimating hand(s)/finger(s) pose(s), and pointing direction vector(s) that indicate a direction that the user is pointing in 3D space. In some cases, past snapshot data is reviewed to determine if the user was pointing to an object that is no longer in the current image frame being processed. For example, the user may have been walking and pointing to an object that is no longer in the camera field of view when the user made their speech query re the object.

As a result of the image and point cloud object detections/labeling, two additional data streams are now available: labeled image-derived 2D bounding boxes and labeled point cloud derived 3D bounding boxes. Each stream includes bounding box data for each detected object that includes a predicted label, position coordinates and a confidence score that indicates a confidence level for the accuracy of the predicted label. Pointing direction vector data can also be included in the TOF object stream.

Next, the 2D/3D bounding box data and finger pointing direction vector(s) are projected in the RGB image frame using known 3D to 2D image projection algorithms. After the projection is applied, the pointer direction is examined to see if it extends through or intersects any 2D bounding boxes derived from the image frame processing, or if any of the 3D/2D bounding boxes overlap and the extent of the overlap.

Next, an inference engine predicts if the user is holding the object in her hand based using a combination of computer vision algorithms and one or more heuristics (e.g., percentage of bounding box overlap) or computer vision algorithms. In this example, an inference is made that the user is holding an object labeled "ticket" in her hand. Based on this information, combined with an inference from the speech input "do I have a winning number?," the inference engine infers that the "ticket" object is a lottery ticket and the user wants to know if she has a winning number. The device then generates a Uniform Resource Locator (URL) to the lottery website that includes the winning lottery numbers. The winning lottery number is "scraped" or otherwise obtained from the lottery website or other lottery data source and compared with the numbers on the ticket captured in the image. A response query is then generated, such as "Sorry. None of your numbers are winners" and presented to the user on a display, projected on a surface (e.g., a table top, wall or the user's palm) by a laser projector of the device, or converted from text to speech by a text-to-speech engine on the device and played through a loudspeaker of the device, or through a wireless transceiver of the device to a wired or wireless headset or earbud worn by the user.

In an embodiment, the camera and/or depth sensor can be used to determine user input using a laser projection of a keyboard, button, slider, rotary dial, or any other graphical user interface affordance. For example, the laser projection system can be used to project a virtual keyboard on any desired surface. The camera can register the location of the keyboard in the image frame, and the depth sensor can be used with the camera image to register the location of the user's finger(s) to determine which keys of the keyboard the user is touching.

Figure 3:
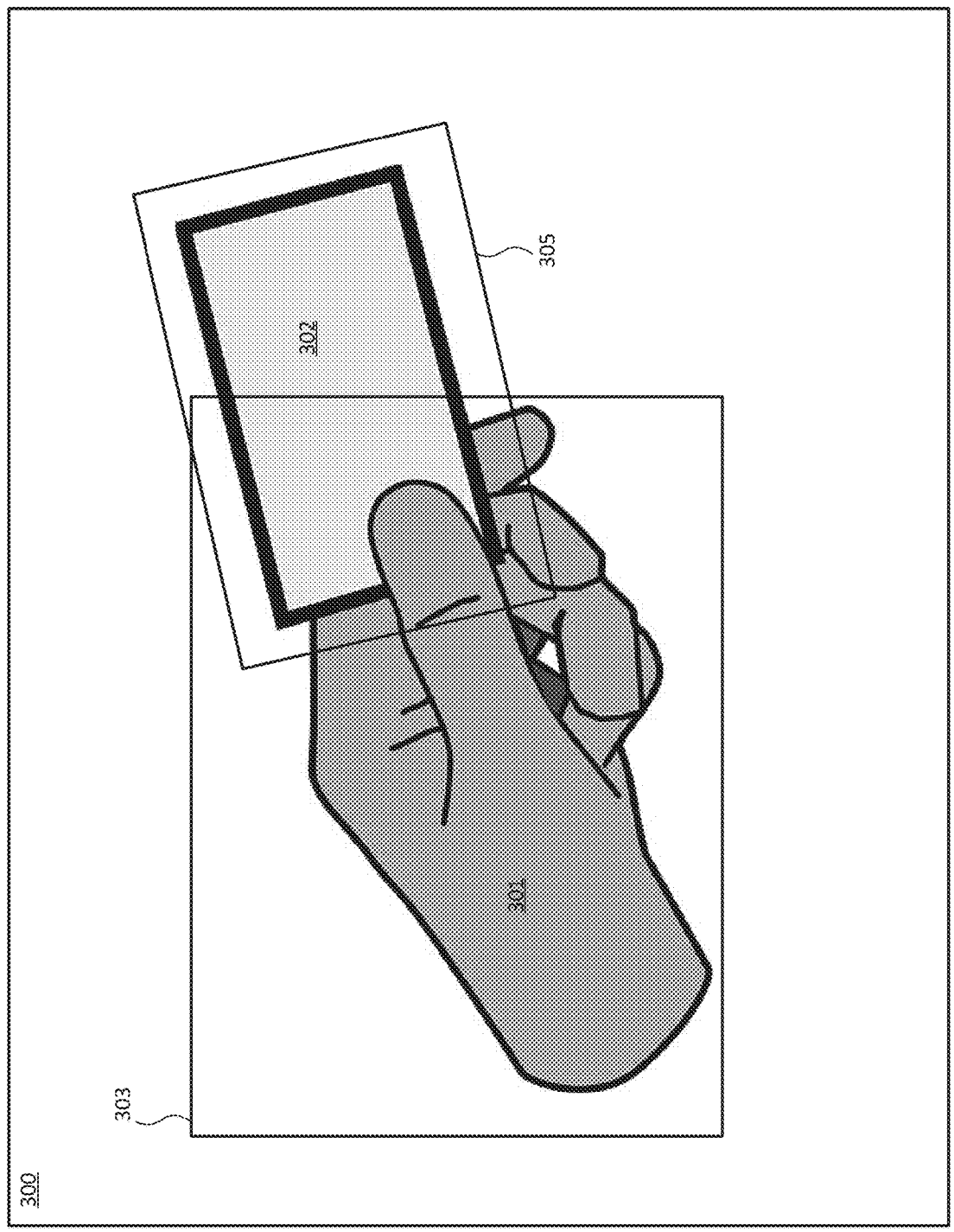
FIG. 3 illustrates a camera image with bounding boxes derived from point cloud data and a camera image, according to an embodiment.

FIG. 3 illustrates data fusion of objects detected in depth data and camera images to infer a user's intent, according to an embodiment. Continuing the example scenario above, an image frame 300 includes labeled 2D bounding box 303 for the user's left hand 301 generated from point cloud data that was projected into image frame 300, and labeled 2D bounding box 305 that includes ticket 302. Based on the proximity and overlap of bounding boxes 303, 305, the inference engine predicts that the user is holding a ticket 302 in her left hand 301, and uses the parsed speech text to infer that the ticket 302 is a lottery ticket and that the user wants to know if she has a winning lottery number.

Example Processes

Figure 4:
FIG. 4 is a flow diagram of a process of capturing a snapshot of multiple, independent real-time data streams in response to a trigger event, inferring user intent and selecting services and/or preparing and presenting content to the user based on the user's intent, according to an embodiment.

FIG. 4 is a flow diagram of a process of capturing a snapshot of multiple, independent real-time data streams in response to trigger event, inferring a user intent and selecting a service and/or preparing and presenting content based on the user intent, according to an embodiment. Process 400 can be implemented, for example, using the device architecture 600 shown in FIG. 6.

Process 400 begins by detecting a new user event from real-time (RT) data streams (401). For example, a speech query can be a trigger event, as described above.

Process 400 continues by obtaining a snapshot and/or history data from one or more RT data streams and/or memory (402). History data includes buffered RT stream data that occurred in the past. The history data can be used in situations, for example, where the current camera FOV does not include an object that is referenced by a current speech query.

Process 400 continues by inferring user intent from the snapshot/history data (403) and then selecting one or more services and/or preparing content based on the inferred user intent using the snapshot/history data (404). Process 400 may perform all or some content preparation locally on the device or on a network-based server depending at least in part on the computational load or complexity of the applications needed for preparing the content.

Process 400 continues by determining a destination for the content and/or requesting the selected service(s) (405), and sending the content to the destination for presentation, storage or use by one or more other applications, and/or sending a service request to a network-based server (406). For example, the content can be presented to the user through one or more output devices, including but not limited to a computer display, a laser projection on a surface, audio loudspeaker or headphone/earbud, heads-up display on smart glasses. The output devices can be wired or wirelessly connected to the wearable multimedia device.

Figure 5A:
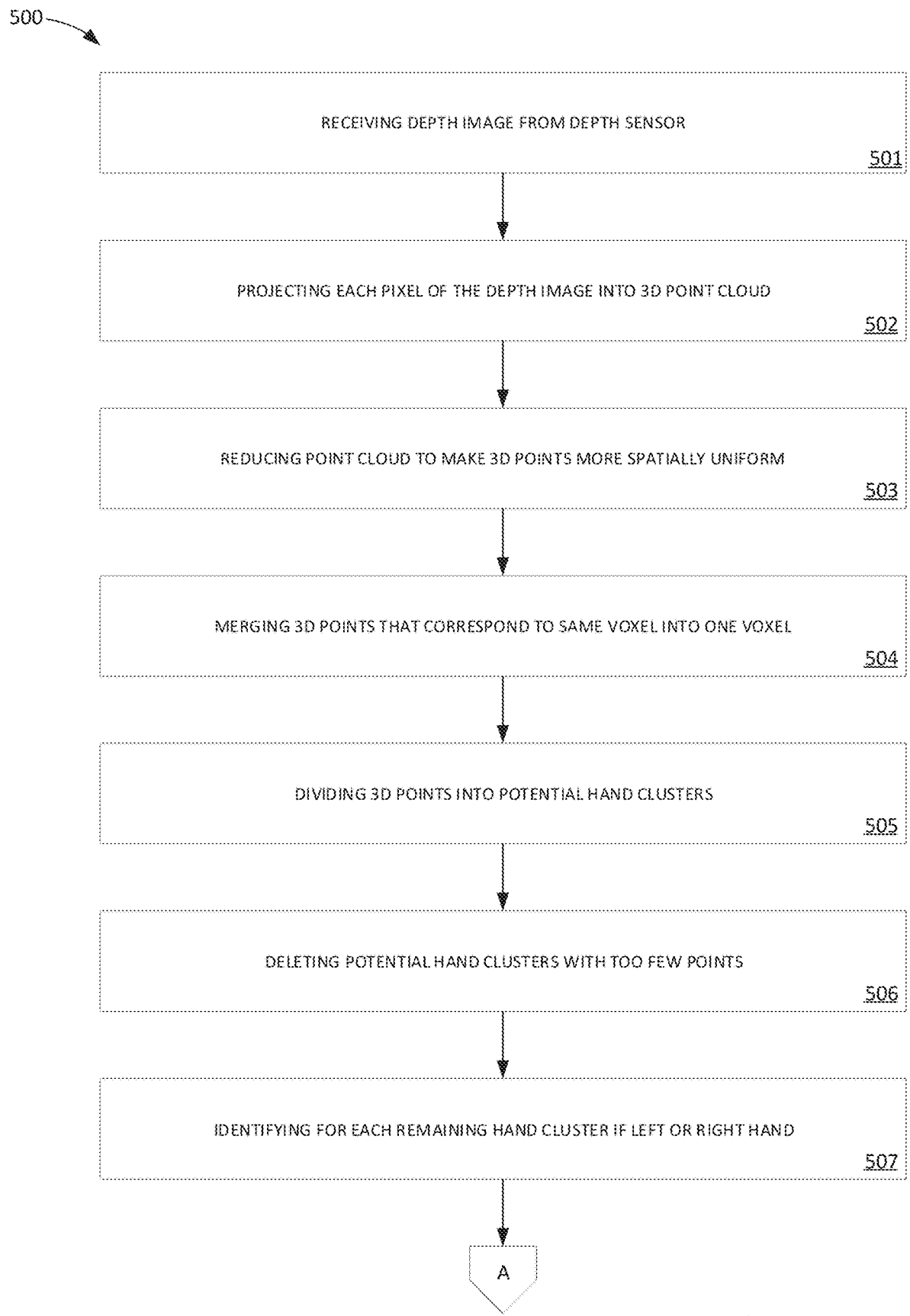
FIGS. 5A-5B are a flow diagram of a data fusion process, according to an embodiment.
Figure 5B:
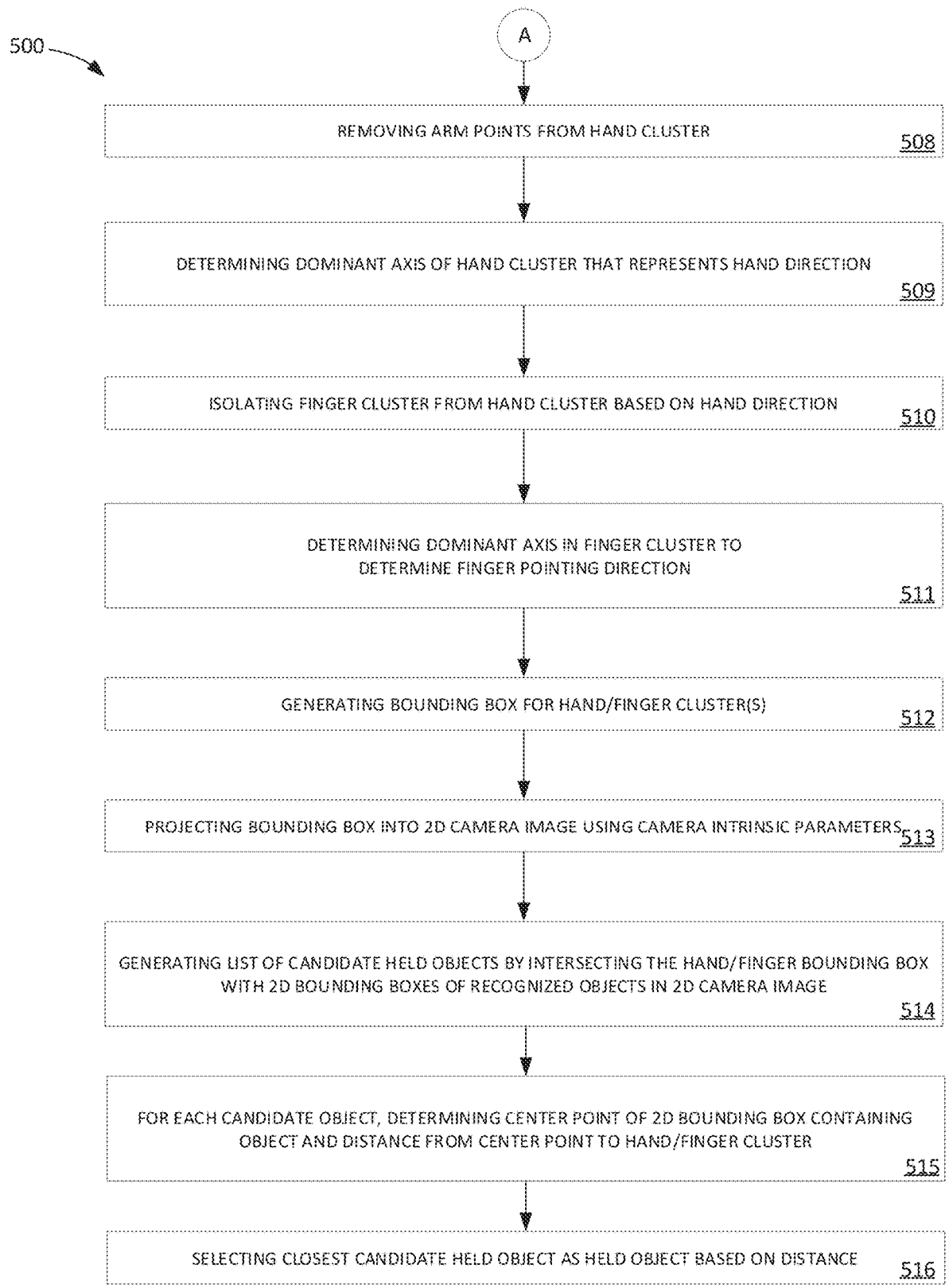

FIGS. 5A-5B is a flow diagram of a data fusion process 500, according to an embodiment. Process 500 can be implemented, for example, using the device architecture 600 shown in FIG. 6. Process 500 includes separate processing pipelines for depth data processing and camera data processing.

Process 500 begins by receiving a depth image frame from a depth sensor (501), and projecting each pixel in the depth image into 3D space using camera intrinsic parameters to generate a point cloud of 3D data points (e.g., x, y, z coordinates) (502). In an embodiment, the depth sensor is a TOF sensor.

Process 500 continues by reducing the point cloud to make the 3D data points more spatially uniform (503) by, for example, using a voxel grid filter to down sample the 3D data points. The voxel grid filter computes a spatial average of the 3D data points confined by each voxel. The set of 3D data points which lie within the bounds of a voxel are assigned to that voxel and are statistically combined into one output 3D data point. In an embodiment, a voxel is 8×8×8 millimeters.

Process 500 continues by dividing the 3D points into clusters (505). In an embodiment, a Euclidian cluster extraction algorithm is used to divide the 3D points into clusters. For example, if the Euclidean distance between two 3D points is less than x mm (e.g., 15 mm) apart, they belong to the same cluster. This typically yields about 10-20 remaining clusters. In an embodiment, other region-based, edge-based or model-based clustering can be used, such as RANSAC, density-based spatial clustering of applications with noise (DBSCAN) and k-means.

Process 500 continues by deleting clusters with too few points (e.g., less than 200 points (506). The deleting of clusters with too few points removes noise and outliers, and typically results in 0 to 2 clusters. If there are no clusters remaining the process assumes that there is no hand in the frame. If there is one cluster remaining the process presumes there is one hand in the frame. If there are two clusters remaining the process assumes that there are two hands in the frame.

Process 500 continues by identifying for each hand cluster if it is a left or right hand (507) by checking from which side the arm points enter the frame. In an embodiment, this is done by counting the number of points in the left and right third of the frame, and whichever of the left or right-third has more points determines if the hand cluster is a left or right hand.

Process 500 continues by removing the arm points from the hand cluster (508). In an embodiment, this is accomplished by starting from the furthest point from the camera, and adding up the visible surface area until a specified surface area dimension is reached (e.g., 140 cm$^2$).

Process 500 continues by determining a dominant axis of the hand cluster that represents the hand direction (509). In an embodiment, the dominant axis of the hand cluster is determined by computing a least squares fit of a line to the points in the hand cluster.

Process 500 continues by isolating a pointing finger cluster (e.g., the index finger) if the user is pointing (510). In an embodiment, the furthest point away from the depth sensor in the hand direction is determined, and the all 3D data points within a specified distance (e.g., 75 mm) of that furthest point is included in the finger cluster.

Process 500 continues by determining a dominant axis of the finger cluster to find the finger pointing direction (511). In an embodiment, the dominant axis of the finger cluster is determined by computing a least squares fit of a line to the points in the finger cluster.

Process 500 continues by generating a bounding box (512) for the hand cluster that also includes any object the hand may be holding (the hand and held object are a single cluster in 3D space), and then projecting the bounding box into 2D space using camera intrinsic parameters computed from viewing a test pattern with a 2D camera and 3D depth sensor at the same time (513).

Process 500 continues by generating a list of candidate held objects by intersecting the resulting 2D bounding box with the 2D bounding boxes of recognized objects in the 2D camera and 3D depth images (514). For each candidate held object, a center point of the 2D bounding box and a distance (e.g., z distance or depth) from the center point to the hand is determined (515), and the closest candidate held object is selected as the held object based on the distances (516).

In an alternative embodiment, hand/finger poses can be identified in the point clusters by analyzing the distribution of points in the clusters using principal component analysis (PCA), where the principal components are eigenvectors, the first eigenvector represents the direction of most variance in the points, the first and second eigenvector define a regression plane in the 3D space and the third eigenvector represents the surface normal to the regression plane. In an embodiment, the first eigenvector can be used to estimate the finger pointing direction.

In an alternative embodiment, a hand/finger pose can be estimated by matching the point cloud to previously generated point clouds of 3D hand/finger models stored in a database. In an embodiment, known 3D object detection deep learning networks, such as PointRNN or VoxelNet can be used to detect and label 3D hands/fingers in the point cloud either on the device or on a network-based server computer.

Proximity Awareness

In an embodiment, the system disclosed herein is responsive or aware of proximity resulting but not limited to finger input to user interface (UI) elements on a laser projected display. Because the depth sensor (e.g., TOF camera) captures the distance, shape and volume of any input element (e.g., finger input) within its field of view that is approaching a surface (e.g., hand, table, etc.), any resulting geometry derived from the depth image can be used with, for example, any UI elements (e.g., sound, visual or gesture). Also, distances from one hand to another hand, or one finger to another finger, or one surface to another surface can be determined and used to trigger one or more actions on the wearable multimedia device or other devices. For example, a laser projector can enlarge UI elements projected on a surface when the finger approaches the UI element based on a distance between a finger and the surface. In other embodiments, the system can adjust the entire scale of the laser projected display based on how far the projection surface is from the depth sensor. For example, as a user moves their hand away from the projection surface, text projected on the surface gets bigger while still being responsive to, e.g., the user "hovering" their hand above the text or moving one or two of their fingers together to make a payment for a transaction performed on the wearable multimedia device or other device.

Example Mobile Device Architecture

Figure 6:
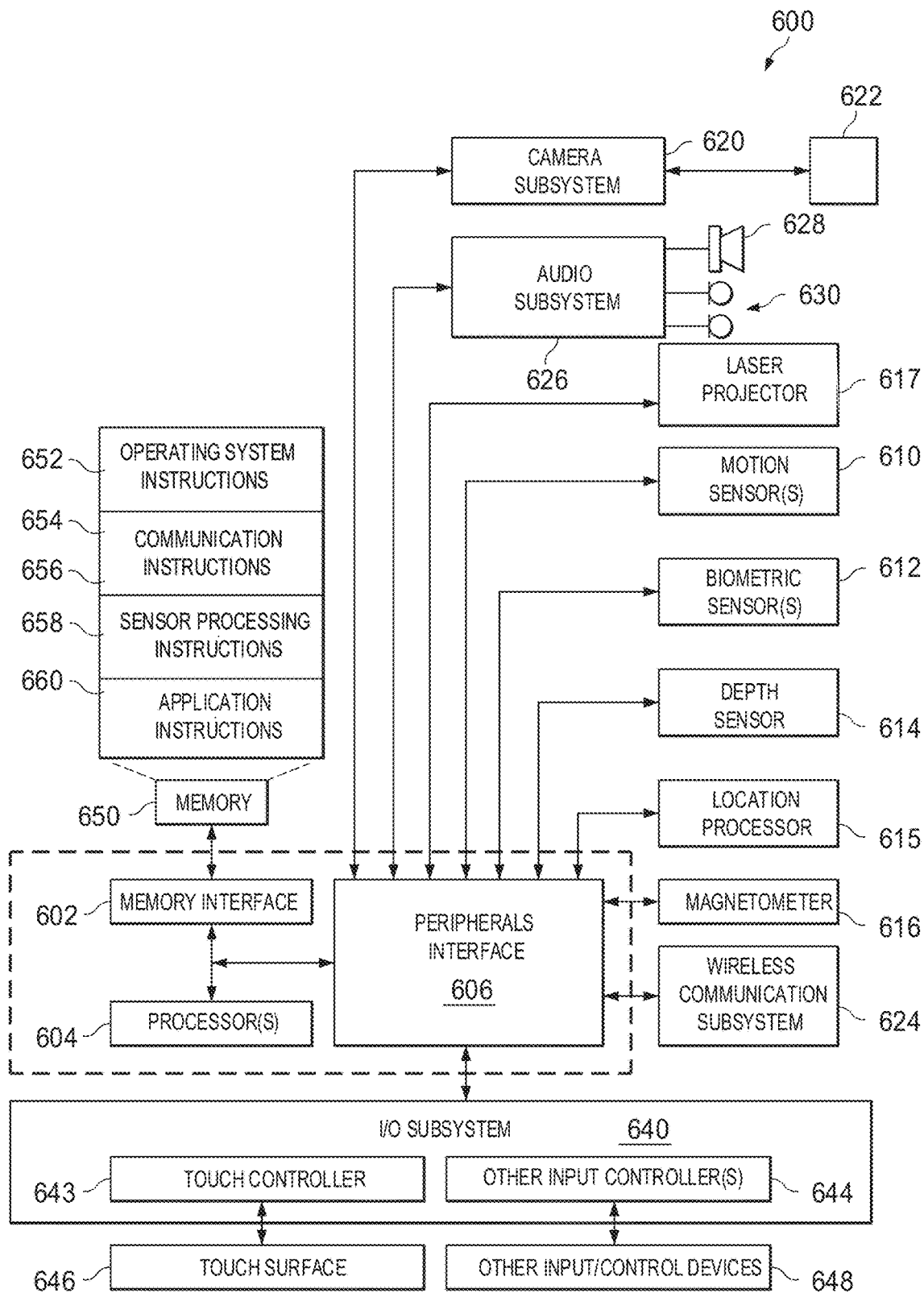
FIG. 6 is an architecture for a mobile device that implements the features and processes described in reference to FIGS. 1-5, according to an embodiment.

FIG. 6 is a block diagram of example architecture 600 for a mobile device implementing the features and processes described in reference to FIGS. 1-5. Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functions. For example, laser projector 617, motion sensor(s) 610, biometric sensor(s) 612, depth sensor 614 may be coupled to peripherals interface 606 to facilitate motion, orientation, biometric and depth detection functions. In some implementations, motion sensor(s) 610 (e.g., an accelerometer, rate gyroscope) may be utilized to detect movement and orientation of the wearable multimedia device.

Other sensors may also be connected to peripherals interface 606, such as environmental sensor(s) (e.g., temperature sensor, barometer, ambient light) to facilitate environment sensing functions. For example, a biometric sensor 612 can detect fingerprints, face recognition, heart rate and other fitness parameters. In an embodiment, a haptic motor (not shown) can be coupled to the peripheral interface, which can provide vibration patterns as haptic feedback to the user.

Location processor 615 (e.g., GNSS receiver chip) may be connected to peripherals interface 606 to provide georeferencing. Electronic magnetometer 616 (e.g., an integrated circuit chip) may also be connected to peripherals interface 606 to provide data that may be used to determine the direction of magnetic North. Thus, electronic magnetometer 616 may be used by an electronic compass application.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and optical image stabilization (OIS). The depth sensor can include an infrared emitter that projects dots in a known pattern onto an object/subject. The dots are then photographed by a dedicated infrared camera and analyzed to determine depth data. An embodiment, a time-of-flight (TOF) camera can be used to resolve distance based on the known speed of light and measuring the TOF of a light signal between the camera and an object/subject for each point of the image.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 624 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 626 may be coupled to a loudspeaker 628 and one or more microphones 630 to facilitate voice-enabled functions, such as voice recognition, voice replication, digital recording, telephony functions and beamforming.

I/O subsystem 640 may include touch controller 642 and/or another input controller(s) 644. Touch controller 642 may be coupled to a touch surface 646. Touch surface 646 and touch controller 642 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 646. In one implementation, touch surface 646 may display virtual or soft buttons, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some implementations, device 600 plays back to a user recorded audio and/or video files, such as MP3, AAC, and MPEG video files. In some implementations, device 600 may include the functionality of an MP3 player and may include a pin connector or other port for tethering to other devices. Other input/output and control devices may be used. In an embodiment, device 600 may include an audio processing unit for streaming audio to an accessory device over a direct or indirect communication link.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, iOS, WINDOWS, or an embedded operating system such as VxWorks. Operating system 652 may include instructions for handling basic system services and for performing hardware dependent tasks. In some implementations, operating system 652 may include a kernel (e.g., UNIX kernel).

Memory 650 may also store communication instructions 654 to facilitate communicating with one or more additional devices, one or more computers or servers, including peer-to-peer communications with wireless accessory devices, as described in reference to FIGS. 1-5. Communication instructions 654 may also be used to select an operational mode or communication medium for use by the device, based on a geographic location of the device.

Memory 650 may include sensor processing instructions 658 to facilitate sensor-related processing and functions and application instructions 660 to facilitate the features and processes, described in reference to FIGS. 1-5. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java, SWIFT), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:

detecting a trigger event from two or more real-time data streams running on a wearable multimedia device, each of the two or more real-time data streams carrying sensor data from a sensor of the wearable multimedia device, wherein the two or more real-time data streams include a first data stream carrying a depth image frame from a depth sensor and a second data stream carrying a two-dimensional (2D) image frame from a camera;

inferring that a user wearing or holding the wearable multimedia device is pointing to or holding an object, the inferring comprising:

projecting each pixel in the depth image frame into three-dimensional (3D) space using camera intrinsic parameters;

generating a point cloud of 3D data points from the projected pixels;

reducing a number of 3D data points in the point cloud to make the 3D data points more spatially uniform;

dividing the reduced number of 3D points into potential hand clusters;

deleting clusters with too few points;

identifying for each potential hand cluster if it is a left or right hand by checking from which side arm points enter the depth image frame;

removing the arm points from the identified hand cluster;

determining a dominant axis of the hand cluster that represents the hand direction;

isolating a finger cluster from the hand cluster;

determining a dominant axis of the finger cluster to determine a finger pointing direction;

projecting a 2D bounding box for the hand into 2D camera image frame using the camera intrinsic parameters;

generating a list of candidate held objects by intersecting the 2D bounding box for the hand with one or more labeled 2D bounding boxes containing one or more recognized objects;

for each candidate held object, determining a center point of the 2D bounding box containing the object and a distance from the center point to the hand cluster; and selecting the closest candidate held object as the held object based on the distances.

2. The method of claim 1, wherein upon detection of the trigger event, current data frames in the real-time data streams and past data frames stored on the wearable multimedia device are collected from data stream buffers.

3. The method of claim 2, wherein the past data frames each have a timestamp within a threshold time distance of the trigger event.

4. The method of claim 1, where reducing the point cloud to make the 3D data points more spatially uniform, comprises:

computing, using a voxel grid filter, a spatial average of the 3D data points confined by each voxel;

determining a set of 3D data points which lie within the bounds of a voxel; and assigning the set of 3D data points to that voxel so as to statistically combine the set of 3D data points into one output 3D data point.

5. The method of claim 1, wherein identifying for each potential hand cluster if the hand cluster is a left or right hand comprises counting a number of the 3D data points in a left and a right third of the depth image frame, and whichever of the left or right-third has more points identifies the hand cluster as a user's left or right hand, respectively.

6. The method of claim 1, wherein the dominant axis of the hand cluster is determined by computing a least squares fit of a line to the 3D data points in the hand cluster.

7. The method of claim 1, wherein isolating a finger cluster from the hand cluster comprises:

determining a 3D data point that is furthest away from the depth sensor; and determining all the 3D data points that are within a specified distance of the furthest point to be the finger cluster.

8. The method of claim 7, wherein the dominant axis of the finger cluster is determined by computing a least squares fit of a line to the 3D data points in the finger cluster.

9. The method of claim 1, wherein deleting clusters with too few points comprises deleting clusters with less than a threshold number of points, determining if there are no clusters remaining, if there is one cluster remaining or if there are two clusters remaining;

in accordance with determining that there are no clusters remaining, determining that there is no hand present in the depth image frame;

in accordance with determining that there is one cluster remaining, determining that there is one hand present in the depth image frame; and in accordance with determining that there is two clusters remaining, determining that there is two hands present in the depth image frame.

10. A system comprising:

at least one processor;

memory storing instructions that when executed by the at least one processor, cause the at least on processor to perform operations comprising:

detecting a trigger event from two or more real-time data streams running on a wearable multimedia device, each of the two or more real-time data streams carrying sensor data from a sensor of the wearable multimedia device, wherein the two or more real-time data streams include a first data stream carrying a depth image frame from a depth sensor and a second data stream carrying a two-dimensional (2D) image frame from a camera;

inferring that a user wearing or holding the wearable multimedia device is pointing to or holding an object, the inferring comprising:

projecting each pixel in the depth image frame into three-dimensional (3D) space using camera intrinsic parameters;

generating a point cloud of 3D data points from the projected pixels;

reducing a number of 3D data points in the point cloud to make the 3D data points more spatially uniform;

dividing the reduced number of 3D points into potential hand clusters;

deleting clusters with too few points;

identifying for each potential hand cluster if it is a left or right hand by checking from which side arm points enter the depth image frame;

removing the arm points from the identified hand cluster;

determining a dominant axis of the hand cluster that represents the hand direction;

isolating a finger cluster from the hand cluster;

determining a dominant axis of the finger cluster to determine a finger pointing direction;

projecting a 2D bounding box for the hand into 2D camera image frame using the camera intrinsic parameters;

generating a list of candidate held objects by intersecting the 2D bounding box for the hand with one or more labeled 2D bounding boxes containing one or more recognized objects;

for each candidate held object, determining a center point of the 2D bounding box containing the object and a distance from the center point to the hand cluster; and selecting the closest candidate held object as the held object based on the distances.

11. The system of claim 10, wherein upon detection of the trigger event, current data frames in the real-time data streams and past data frames stored on the wearable multimedia device are collected from data stream buffers.

12. The system of claim 11, wherein the past data frames each have a timestamp within a threshold time distance of the trigger event.

13. The system of claim 10, where reducing the point cloud to make the 3D data points more spatially uniform, comprises:

computing, using a voxel grid filter, a spatial average of the 3D data points confined by each voxel;

determining a set of 3D data points which lie within the bounds of a voxel; and assigning the set of 3D data points to that voxel so as to statistically combine the set of 3D data points into one output 3D data point.

14. The system of claim 10, wherein identifying for each potential hand cluster if the hand cluster is a left or right hand comprises counting a number of the 3D data points in a left and a right third of the depth image frame, and whichever of the left or right-third has more points identifies the hand cluster as a user's left or right hand, respectively.

15. The system of claim 10, wherein the dominant axis of the hand cluster is determined by computing a least squares fit of a line to the 3D data points in the hand cluster.

16. The system of claim 10, wherein isolating a finger cluster from the hand cluster comprises:
- determining a 3D data point that is furthest away from the depth sensor; and
- determining all the 3D data points that are within a specified distance of the furthest point to be the finger cluster.

17. The system of claim 16, wherein the dominant axis of the finger cluster is determined by computing a least squares fit of a line to the 3D data points in the finger cluster.

18. The system of claim 10, wherein deleting clusters with too few points comprises deleting clusters with less than a threshold number of points, determining if there are no clusters remaining, if there is one cluster remaining or if there are two clusters remaining;
- in accordance with determining that there are no clusters remaining, determining that there is no hand present in the depth image frame;
- in accordance with determining that there is one cluster remaining, determining that there is one hand present in the depth image frame; and
- in accordance with determining that there is two clusters remaining, determining that there is two hands present in the depth image frame.

* * * * *